Mar. 6, 1923.
C. W. CHERRY.
SELENIUM CELL OR BRIDGE.
FILED APR. 13, 1922.
1,447,646.
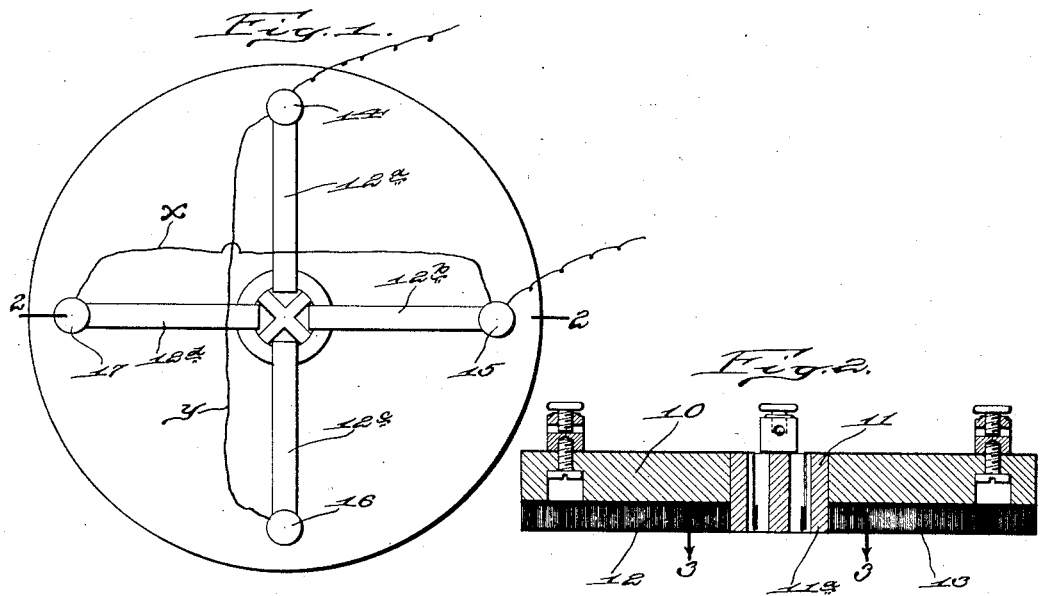
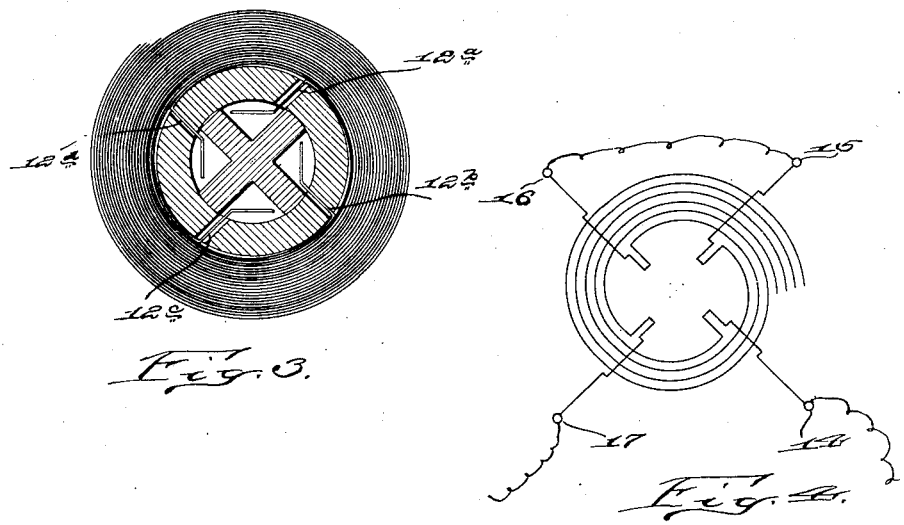
Inventor:
Carl W Cherry,
by Clyde L. Rogers
his atty.

Patented Mar. 6, 1923.

1,447,646

UNITED STATES PATENT OFFICE.

CARL W. CHERRY, OF BOSTON, MASSACHUSETTS.

SELENIUM CELL OR BRIDGE.

Application filed April 13, 1922. Serial No. 552,302.

*To all whom it may concern:*

Be it known that I, CARL W. CHERRY, a citizen of the United States, and resident of Boston, county of Suffolk, Commonwealth of Massachusetts, have invented an Improvement in Selenium Cells or Bridges, of which the following description, in connection with the accompanying drawings, is a specification, like characters on the drawings representing like parts in each of the several views.

This invention relates to the class of instruments known as selenium "cells" or bridges, which are adapted for measuring the intensity of light and which depend upon the quality of varying electric resistance exhibited by selenium according as it is exposed to light of a greater or less intensity. While I refer to selenium in the present disclosure as the light sensitive element of the combination, it is to be understood that this is merely illustrative and that the invention may be carried out with any other element having the quality of varying electrical resistance according to its exposure to light. The principal object of the invention is to provide a selenium cell or bridge presenting a larger active surface area of selenium for a given quantity of this element, thus effecting a saving in the amount of selenium required as compared with present types of selenium cells. A further object is to provide an improved form of selenium cell that is more compact, of more substantial construction, and capable of being more easily manufactured than present known types. A still further object is to provide a selenium cell or bridge of relatively increased sensitiveness, and having also a greater range of sensitiveness than is exhibited in known types. The foregoing and other objects and advantages of the invention will more fully appear from the following detailed description taken in connection with the accompanying drawings, and the distinctive features of novelty will be pointed out in the appended claims.

Referring to the drawings:

Fig. 1 is a plan view of a selenium cell embodying the invention;

Fig. 2 is a diametrical section thereof on line 2—2 of Figure 1;

Fig. 3 is a relatively enlarged partial sectional view on line 3—3 of Figure 2; and Fig. 4 is a plan view illustrating an optional arrangement of electric connections.

10 indicates a backing or base member of the device which may be of wood, fibre, rubber or other suitable material. This base member is in the form of a disc with a central core 11 to which the terminals of the conductive strips lead, though within the contemplation of the invention this core or the central opening in which it fits may be relatively enlarged so that the base 10 and the conductive strips thereon to be described will assume the form of a ring or annulus. The core 11 projects from the base at one side thereof a small distance as indicated at 11$^a$ and upon this projecting portion are wound a plurality of electrical strips 12 separated by insulating strips of paper or other suitable insulator. These conductive strips may be of any suitable material such as copper, German silver or the like, and the number thereof may be varied. As shown four of these conductive strips 12$^a$, 12$^b$, 12$^c$, 12$^d$ lead out from the core at spaced apart points and are wound in superposed relation upon the core to make up the full diameter of the disc 10 with the paper or like insulating medium interposed between the layers as already described. This paper or like insulating medium thus holds the conductive strips spaced and insulated from one another throughout the windings thereof, but it does not extend outward beyond, or preferably quite to the outer edges of the strips. A relatively thin layer 13 of selenium is applied to the surface constituted by the edges of the metallic strips thus wound into the close coil 12, this selenium layer thus bridging between adjacent windings of the several conductive strips. The inner ends of the several conductive strips 12$^a$, 12$^b$, 12$^c$, 12$^d$ are continued radially outward of the backing or base 10 to the respective binding posts 14, 15, 16, 17, the binding post 14 being thus connected to the innermost strip with the posts 15, 16 respectively connected to the succeeding outer strips and the post 17 connected to the outermost strip. In case it is desired to use the device to exhibit a relatively lower range of resistance, the binding posts 14, 16 may be connected and the posts 15, 17 also connected as indicated at $x$, $y$ in Figure 1, with a connection from the source of electric energy to each of these connected pairs of posts. This disposes the conductive strips in "parallel," i. e. so that the current can pass from both conductive strips 12ᵃ, 12ᶜ to both of the strips 12ᵇ, 12ᵈ through the selenium layer. In case a range of higher resistances is desired the connections between the binding posts are omitted and the connections from the source of electric energy made to the posts 14, 17 respectively. In this case the current will have to travel across the entire extent of the selenium from the innermost conductive layer 12ᵃ, to the outermost layer 12ᵈ. Another selective wiring arrangement whereby a still higher range of resistances may be obtained is indicated in Figure 4. In this case the circuit connections are made to the terminals of the inner and outer strips 14 and 17 respectively, and a bridging connection indicated at $z$ is made between the intermediate terminals 15, 16. This results in rendering inactive the selenium area between the two intermediate strips, and requiring the current to pass first through the selenium bridge between the inner strip and the one next thereto, and then from the next to the outer strip to the outer strip, thus in effect arranging these selenium bridge portions in "series". By arranging the conductive strips in the compact disc winding 12, I am enabled to obtain a maximum of effectiveness for a given area and quantity of selenium and by reason of the disc form the device is handier and more compact, and is at the same time more convenient of manufacture since it can be handled in a lathe or like machine on centers. I am aware that the invention may be embodied in other specific forms without departing from the spirit or essential attributes thereof, and I therefore desire the present embodiment to be considered in all respects as illustrative, and not restrictive, reference being had to the appended claims rather than to the foregoing description to indicate the scope of the invention.

Having described my invention, what I claim as new and desire to secure by Letters Patent is:

1. A selenium bridge or cell comprising a disc base or backing, and a plurality of conductive strips wound in a compact coil with interposed insulation upon one face thereof with a layer of selenium applied to the surface of such winding.

2. A selenium cell or bridge comprising a disc backing, a plurality of conductive strips wound into a close coil upon one face of said disc with interposed insulation, and with said disc bearing terminals from the respective strips, and a surfacing of selenium applied to said coil.

3. A selenium cell or bridge comprising a plurality of conductive strips wound into a disc coil with interposed insulation, and a facing of selenium applied to a surface of said disc.

4. A selenium cell or bridge comprising a series of conductive strips wound into a disc coil with interposed insulation, a facing of selenium applied to a surface of said coil, and means for connecting said strips in parallel at will.

In testimony whereof, I have signed my name to this specification.

CARL W. CHERRY.